TELEVISION DEFLECTION CIRCUIT WITH COMPENSATION FOR VOLTAGE SUPPLY VARIATIONS
Filed March 28, 1966
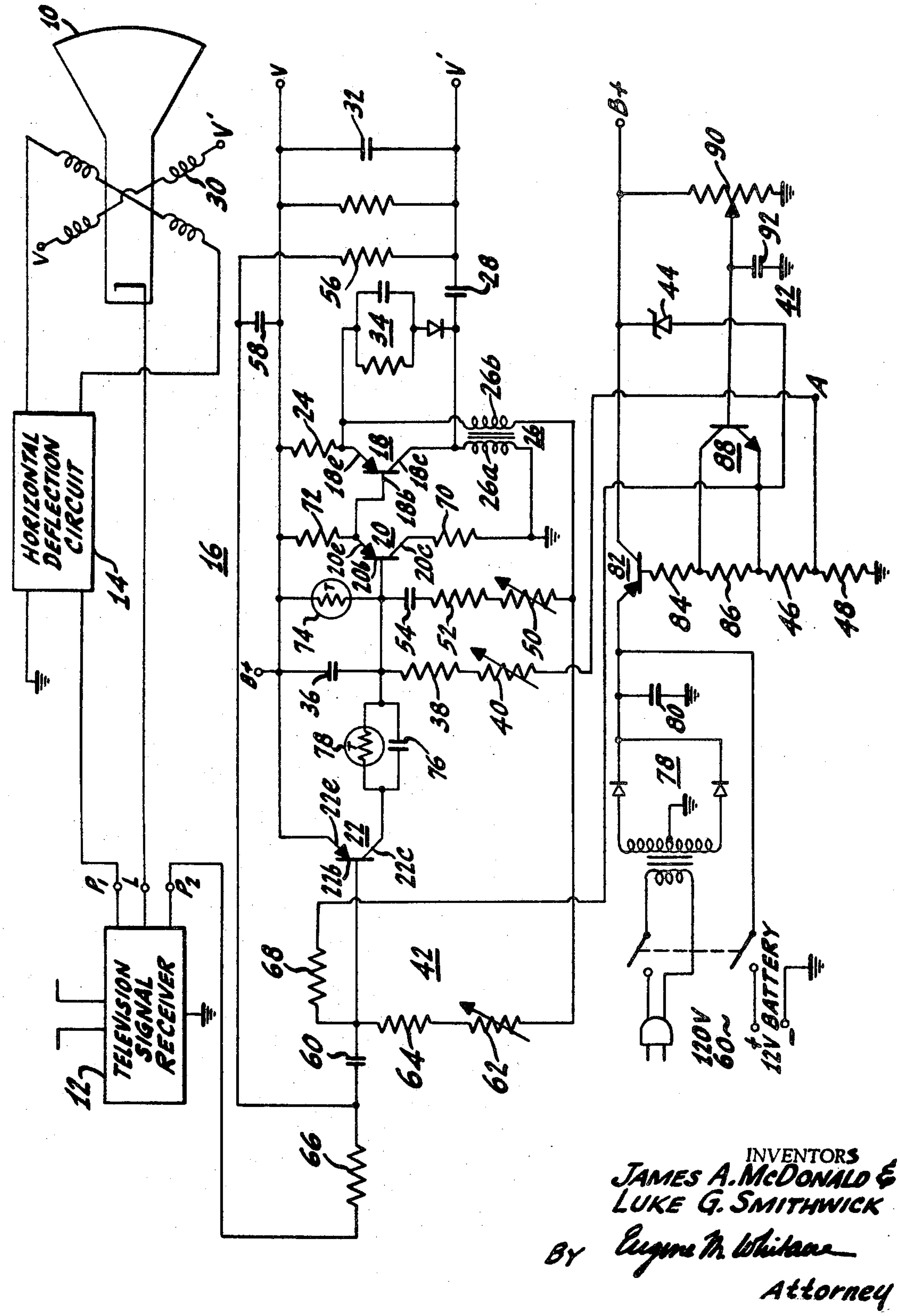
INVENTORS
JAMES A. McDONALD &
LUKE G. SMITHWICK
BY Eugene M. Whitacre
Attorney 3,402,318

TELEVISION DEFLECTION CIRCUIT WITH COMPENSATION FOR VOLTAGE SUPPLY VARIATIONS

James A. McDonald and Luke Gene Smithwick, Indianapolis, Ind., assignors to Radio Corporation of America, a corporation of Delaware Filed Mar. 28, 1966, Ser. No. 538,075
8 Claims. (Cl. 315—27)

ABSTRACT OF THE DISCLOSURE

A television deflection circuit comprising a sawtooth waveform generating capacitor coupled to an output amplifier and a compensated voltage supply coupled to the capacitor to maintain image size constant despite supply voltage changes. A retrace switching device coupled across the capacitor is provided with bias voltage derived from the compensated supply to maintain operating frequency constant despite supply voltage changes. Low frequency oscillations in the scanning waveform are precluded by means of a feedback network coupled to the output amplifier.

This invention relates to electromagnetic cathode ray beam deflection circuits of the type employed in television receivers and, in particular, to transistor vertical deflection circuits including apparatus for precluding variations in the vertical direction of the scanning raster produced on an associated cathode ray tube.

One type of vertical deflection circuit utilizes a capacitor which is charged through a relatively high impedance from a source of direct voltage. The voltage produced across the capacitor is applied to an amplifier to generate a substantially sawtooth shaped current for application to vertical deflection windings associated with a cathode ray tube. The electron beam of the cathode ray tube is thereby deflected in the vertical direction. A switching device coupled across the capacitor is utilized to discharge the capacitor at a predetermined time in the deflection cycle to return the electron beam to its initial position to prepare for the next deflection cycle. The deflection circuit is rendered self-oscillating by feeding back to the switching device a retrace voltage pulse that is developed when the current supplied to the vertical deflection windings ceases. The deflection cycles are synchronized by means of vertical synchronizing signals transmitted to the television receiver along with the video signal information.

In such circuits, additional feedback paths generally are provided for improving the linearity of the deflection waveform and for controlling more accurately the initiation of the retrace portion of each deflection cycle. Provision of such additional feedback paths frequently results in self-oscillations at frequencies other than the desired vertical deflection frequency thereby superimposing upon the desired deflection waveform an undesired modulation. Such modulation produces undesired variations or jitter of the image in the vertical direction. Further sources of image variations in the vertical direction commonly found in such circuits result from variations in the supply voltage applied to the switching device and variations in the charging voltage coupled to the sawtooth capacitor. The present invention is directed to circuitry for reducing variations of the image in the vertical direction resulting from the above-described causes.

In accordance with the present invention, the desired stabilization is achieved by coupling the sawtooth capacitor to a compensated voltage supply arranged to maintain vertical image size substantially constant. In accordance with a further feature of the present invention, a bias voltage for the switching device also is obtained from the compensated voltage supply. In accordance with still another feature of the present invention, further compensating means are provided in a linearity control feedback network to reduce unwanted oscillations in the image in the vertical sense.

A primary object of the present invention therefore is to provide a novel and improved transistor vertical deflection circuit.

A further object of the present invention is to provide a transistor vertical deflection circuit including apparatus for reducing undesired changes in the image in the vertical direction.

The novel features that are considered characteristic of this invention are set forth with particularity in the appended claims. The invention itself, however, both as to its organization and method of operation as well as additional objects thereof, will best be understood from the following description when read in connection with the accompanying drawing.

In the drawing, the bulk of the circuits of a television receiver serving to provide signals for energizing an image reproducing device such as a kinescope 10 are represented by a single block 12 labelled "Television Signal Receiver." The receiver unit 12 incorporates the usual elements required to provide video signals (at output terminal L) for appropriate intensity modulation of the electron beam of kinescope 10, as well as to provide suitable synchronizing pulse information (at terminals $P_1$ and $P_2$) to synchronize, in respective horizontal and vertical deflection circuits 14 and 16, the energization of the respective windings (H, H' and V, V') of the deflection yoke associated with kinescope 10.

The vertical deflection circuit shown in the drawing comprises an output transistor 18 having a base **18*b*, a collector 18*c*; and an emitter 18*e*; an emitter follower driver transistor 20 having a base 20*b*, a collector 20*c*, and an emitter 20*e*; and a switching transistor 22 having a base 22*b*, a collector 22*c*, and an emitter 22*e*. The emitter 18*e* of output transistor 18 is coupled by means of an anti-lock-on resistor 24 to a first terminal of a source of operating voltage B+, the details of the source being set forth below. The collector 18*c* is connected to a second terminal, shown as chassis ground, of the voltage source through the primary winding 26*a* of a transformer 26. The collector 18*c* is further connected by means of a coupling capacitor 28 to one terminal V' of the vertical deflection windings 30, the terminal V being connected to B+. A bypass capacitor 32 for bypassing signals at frequencies greater than the vertical deflection frequency (e.g. horizontal deflection frequency) is also coupled between the terminals V and V'. A clamping circuit 34 is coupled between emitter 18*e* and collector 18*c* to protect output transistor 18** against excessive voltages during the retrace interval.

In order to supply a sawtooth driving signal to the base **18*b* of the output transistor 18, a sawtooth capacitor 36 is connected between the base 20*b* of driver transistor 20 and the source of operating voltage B+. The side of capacitor 36 which is coupled to base 20*b* is also coupled by means of the series combination of a fixed resistor 38 and a variable resistor 40, the latter serving as a vertical size control, to a point of reference potential A provided by a voltage divider 42. The voltage divider 42 comprises the series combination of a voltage regulating device, such as a Zener diode 44 and first and second fixed resistors 46 and 48** coupled between the source of operating voltage B+ and chassis ground.

The driving voltage applied to base **20*b* of transistor 20 is properly shaped by feedback from the secondary winding 26*b* of transformer 26 to the base 20*b***.

This feedback modifies the current through the vertical deflection windings 30 to improve the linearity of the scanning raster in the vertical direction. A linearity control potentiometer 50 and a limiting resistor 52 are included in the feedback connection. Variation of the linearity control 50 varies the shape of the driving of the linearity control 50 varies the shape of the driving voltage on the base 20*b*. A capacitor 54 selected in accordance with the present invention to prevent undesired relatively low frequency oscillations is also included in the feedback connection.

In order to maintain self-oscillations in the circuit, the voltage appearing at the terminal V′ is fed back through a network comprising resistor 56, capacitor 58, and coupling capacitor 60 to the base 22*b* of switching transistor 22. To enhance the accuracy of the timing of the vertical deflection waveform generation, an additional waveform is fed back from the output transistor 18 to the base 22*b* of switching transistor 22. This additional waveform is derived from the secondary winding 26*b* of transformer 26. The waveform across secondary winding 26*b* may be described as a sawtooth plus a retrace spike. This waveform is fed back to base 22*b* via a resistive path including a variable resistor vertical hold control 62 and a fixed resistor 64. The resistive path cooperates with the capacitance present at base 22*b* to integrate the derived waveform thereby adding a generally parabolic component to the waveform at base 22*b*. The produced waveform may be adjusted by means of hold control 62 to provide a steep slope near the end of the trace interval rendering the timing of the turn-on of switching transistor 22 substantially insensitive to noise or changes in circuit parameters.

The operation of switching transistor 22 is synchronized with respect to the image portion of the received television signal by means of vertical synchronizing pulses applied from terminal $P_2$ via resistor 66 and capacitor 60 to base 22*b*.

The emitter follower driver transistor 20 includes a resistor 70 coupled between collector 20*c* and chassis ground and a resistor 72 connected between emitter 20*e* and the B+ voltage supply. Temperature compensation of the base-emitter bias of driver transistor 20 is provided by means of thermistor 74 connected between base 20*b* and the B+ terminal. A further compensating network comprising the parallel combination of capacitor 76 and thermistor 78 is coupled in the discharge path of sawtooth capacitor 36 between collector 22*c* of switching transistor 22 and base 20*b* of driver transistor 20.

The source of operating voltage B+ is arranged to be derived either from a 120 volt, 60 cycle per second alternating current supply or from a 12 volt direct current battery supply. For operation from a 120 volt supply, a full wave rectifier circuit 78 is provided for producing across a filter capacitor 80 approximately 12 volts of positive direct voltage. For portable use, an external battery may be connected to supply the voltage across capacitor 80. A series regulating transistor 82 is provided which serves as a variable impedance between the positive side of capacitor 80 and the output B+ terminal of the supply. The control (base) electrode of transistor 82 is coupled to chassis ground by means of the series combination of resistors 84, 86, 46 and 48. A control transistor 88 is coupled across resistor 86 to vary the impedance between the base electrode of transistor 82 and ground thereby controlling the conduction of transistor 82 to maintain a substantially constant voltage at the B+ terminal. To accomplish this result, a portion of the voltage produced at the B+ terminal is coupled by means of a potentiometer 90 and a capacitor 92 to the base electrode of control transistor 88. At the same time, a voltage including substantially all the variations but only a portion of the direct component produced at the B+ terminal is supplied by means of the voltage divider 42 to the emitter electrode of control transistor 88. The combination of the voltages applied to the base and emitter electrodes of control transistor 88 act to modify the operation of series regulating transistor 82 so as to reduce substantially the variations in the voltage produced at the B+ terminal.

A stabilized DC bias for the base 22*b* of switching transistor 22 is provided by means of the connection of resistor 68 between base 22*b* and the junction of Zener diode 44 and resistor 46.

The operation of the deflection circuit 16 is best described by assuming that the sawtooth capacitor 36 initially is discharged. Capacitor 36 begins to charge via the circuit path including resistor 38, height control 40 and resistor 48 such that the base electrode 20*b* of driver transistor 20 is driven in a negative direction (i.e. less positive) with respect to emitter 20*e*. As the voltage across sawtooth capacitor 36 increases, driver transistor 20 and consequently output transistor 18 are driven into conduction. The voltage at collector 18*c* rises towards the B+ level producing, under the combined influence of the voltage across capacitor 36 and the feedback applied to base 20*b*, a slightly S-shaped current waveform in the vertical deflection windings 30. At the end of the trace portion of the deflection cycle, a vertical synchronizing pulse is applied to base 22*b* of switching transistor 22. As transistor 22 is turned on, sawtooth capacitor 36 begins to discharge rapidly through the path including the parallel combination of thermistor 78 and capacitor 76 and the emitter-collector circuit of switching transistor 22. Transistors 20 and 18 thereupon are driven towards cut-off tending to abruptly reduce the current through vertical deflection windings 30 and thereby generate a large retrace voltage pulse across such windings. The retrace voltage pulse is coupled back through the network including resistor 56 and capacitor 58 to the base of switching transistor 22*b*, causing heavy base current to flow and thereby charging capacitor 60 in such a manner as to maintain switching transistor 22 cut-off after the cessation of the retrace pulse.

The circuit parameters are adjusted such that, as the voltage across sawtooth capacitor 36 approaches zero, switching transistor 22 is once more driven to cut-off, ending the discharge cycle of capacitor 36 and re-commencing the charging or trace cycle. The above-described operation is repeated for each vertical deflection cycle.

In the normal operation of the television receiver, the voltage supplied at the B+ terminal is subject to variations, for example as a result of variations in the AC line voltage to which the receiver is connected. Such variations in the supply voltage may produce variations in the size of the image produced on the face of kinescope 10 unless compensating means are provided.

Specifically, the amplitude of the sawtooth deflection current waveform applied to the deflection windings 30 and hence vertical image size is dependent upon the amplitude of the voltage produced across capacitor 36 during the trace portion of the deflection interval. The voltage across capacitor 36 is dependent upon the charging time constant (which is determined principally by the values of capacitor 36, resistor 38 and the setting of size control 40) and upon the magnitude of the voltage applied between the B+ terminal and the reference voltage point labelled A. In accordance with the present invention, the charging voltage applied to capacitor 36 between the B+ terminal and the terminal labelled A is stabilized in such a manner as to minimize or reduce variations in vertical image size as the B+ voltage varies. The voltage divider 42 including Zener diode 44, resistor 46 and resistor 48 provides the desired degree of stabilization for this charging voltage. The operating characteristics of Zener diode 44 are such that the voltage across diode 44 remains substantially constant and the entire variations in B+ voltage appear as variations in the fractional portion of the B+ voltage which appears across the series combination of resistors 46 and 48. The two last-named resistors are proportioned such that the charging voltage applied across capacitor 36 is caused to vary in a substantially precise reduced manner with respect to variations in the B+ voltage. The last-mentioned variations in capacitor voltage are provided to compensate for the effect of variations in B+ supply voltage on the high electron beam accelerating voltage supplied to the final anode of kinescope 10. Such variations in the electron beam accelerating voltage would cause variations in image size if the charging voltage applied to capacitor 36 was maintained exactly constant. Vertical image size is therefore maintained substantially constant despite variations in the B+ supply voltage.

In accordance with another aspect of the invention, the base-emitter voltage applied to transistor 22 is derived from voltage divider 42 so as to stabilize the operating point of transistor 22 and thereby stabilize vertical frequency against variations in B+ supply voltage.

In accordance with a further aspect of the present invention, variations of the image in a vertical sense resulting from relatively low frequency oscillations (as compared with the vertical scanning frequency) are prevented by means of the inclusion of a capacitor 54 in the linearity control feedback network. The capacitor 54 is proportioned with respect to parameters of that feedback network so as to pass the desired 60 cycle signals but substantially attenuate undesired feedback at lower frequencies.

By way of example, a set of values for the circuit parameters shown in the drawing, which values have proven satisfactory in operation, are presented below.

| | |
|---|---|
| B+ supply voltage ____volts__ | +12 |
| Transistor: | |
| **18** ____ | 2N 2869 |
| **20** ____ | 2N 2614 |
| **22** ____ | 2N 3638 |
| Resistor **24** ____ohms__ | 2.2 |
| Capacitor **28** ____microfarads__ | 250 |
| Vertial deflection windings **30** millihenries (36 ohms)__ | 83 |
| Capacitor: | |
| **32** ____microfarads__ | .039 |
| **36** ____do____ | 18 |
| Resistor **38** ____ohms__ | 3300 |
| Potentiometer **40** ____do____ | 3500 |
| Zener diode **44** ____volts__ | 6.8 |
| Resistor: | |
| **46** ____ohms__ | 10 |
| **48** ____do____ | 100 |
| Potentiometer **50** ____do____ | 10,000 |
| Resistor **52** ____do____ | 1,000 |
| Capacitor **54** ____microfarads__ | 5 |
| Resistor **56** ____ohms__ | 2200 |
| Capacitor: | |
| **58** ____microfarads__ | 0.33 |
| **60** ____do____ | 0.47 |
| Potentiometer **62** ____ohms__ | 15,000 |
| Resistor: | |
| **64** ____do____ | 5600 |
| **66** ____do____ | 2700 |
| **68** ____do____ | 220,000 |
| **70** ____do____ | 3300 |
| **72** ____do____ | 68 |
| Thermistor **74** ____ohms at 25° C.__ | 3300 |
| Capacitor **76** ____microfarads__ | 20 |
| Thermistor **78** ____ | (1) |

[1] 16 ohms at 25° C., 8 ohms at 45° C.

What is claimed is:

1. In a television receiver having a cathode ray image reproducing tube and vertical deflection windings associated with said tube, a vertical deflection circuit comprising:

a transistor amplifier having input, output, and common terminals;

a capacitor coupled to said amplifier input terminal;

a charging circuit for said capacitor including, in series combination, a Zener diode and at least a first resistor coupled across a direct voltage supply subject to variations and means for coupling said capacitor to a reference voltage terminal intermediate said diode and resistor;

a discharging circuit for said capacitor including a switching device having input, output, and common terminals, said capacitor being coupled between said output and common terminals of said switching device;

means for coupling said vertical deflection windings between said output and common terminals of said amplifier;

and first feedback means coupled between said amplifier output terminal and said switching device input terminal for producing self-oscillations in said circuit whereby a scanning raster is produced on said cathode ray tube having a substantially constant size in the vertical direction despite variations in the voltage provided by said direct voltage supply.

2. In a television receiver, a vertical deflection circuit according to claim 1 wherein said capacitor charging circuit comprises a second resistor coupled in series relation between said Zener diode and said first resistor, said reference voltage terminal being provided intermediate said first resistor and said second resistor.

3. In a television receiver, a vertical deflection circuit according to claim 2 wherein said first and second resistors are proportioned such that variations in said direct voltage supply are coupled to said capacitor in a reduced manner so as to maintain raster size in the vertical direction substantially constant despite variations in cathode ray beam accelerating voltage resulting from variations in said direct voltage supply.

4. In a television receiver, a vertical deflection circuit according to claim 3 and further comprising:

a third resistor coupled from the junction of said Zener diode and said second resistor to said switching device input terminal for stabilizing operation of said switching device despite variations in said direct voltage supply.

5. In a television receiver, a vertical deflection circuit according to claim 1 and further comprising:

second feedback means coupled between said amplifier output terminal and said amplifier input terminal for adjusting the waveform produced at said amplifier output terminal, said second feedback means including a variable resistance linearity control and a capacitor for reducing the tendency of said output amplifier to oscillate at frequencies substantially lower than the vertical deflection frequency.

6. In a television receiver, a vertical deflection circuit according to claim 5 wherein said means for coupling said vertical deflection windings between said output and common terminals of said amplifier comprises a relatively large capacitance coupling capacitor and said first feedback means comprises a transformer.

7. In a television receiver having a cathode ray image reproducing tube and vertical deflection windings associated with said tube, the combination comprising:

a direct voltage supply including a series regulating transistor coupled between a voltage source subject to substantial variations and a voltage terminal, a control transistor coupled between said voltage terminal and said regulating transistor for varying the conduction of said regulating transistor and voltage divider means including the series combination of a Zener diode and at least one resistor coupled to said voltage terminal and to said control transistor for varying conduction in said control and regulating transistors to substantially reduce variations in the voltage produced at said voltage terminal, the combination further comprising a transistor amplifier having input, output, and common terminals;

a capacitor coupled to said amplifier input terminal;

a charging circuit for said capacitor including resistance means for coupling said capacitor to a reference terminal intermediate said Zener diode and said resistor;

a discharging circuit for said capacitor including a switching device having input, output, and common terminals, said capacitor being coupled between said output and common terminals of said switching device;

means for coupling said vertical deflection windings between said output and common terminals of said amplifier;

and first feedback means coupled between said amplifier output terminal and said switching device input terminal for producing self-oscillations in said circuit whereby a scanning raster is produced on said cathode ray tube having a substantially constant size in the vertical direction despite variations in the voltage provided by said direct voltage supply.

8. A sawtooth wave generator comprising:

means providing a source of operating voltage having a pair of terminals;

a voltage regulating device;

first and second resistance means;

means connecting said regulating device and said first and second resistance means in series between said operating voltage source terminals;

a charging capacitor having a pair of terminals;

third resistance means;

means connecting said charging capacitor, said third resistance means and said second resistance means in series between said operating voltage source terminals so that said charging capacitor and said third resistance means are in parallel with said regulating device and said first resistance means;

a switching means having input, output and common electrodes;

means connecting said output and common electrodes to respective terminals of said charging capacitor; and means for coupling said input electrode of said switching means to the junction of said regulating device and said first resistance means for stabilizing operation of said switching means despite variations in said source of voltage.

References Cited

UNITED STATES PATENTS

| | | | |
|---|---|---|---|
| 3,185,889 | 5/1965 | Attwood | 315—27 |

RODNEY D. BENNETT, *Primary Examiner.*

J. G. BAXTER, *Assistant Examiner.*